United States Patent
Hall, Jr. et al.

(10) Patent No.: US 7,950,906 B2
(45) Date of Patent: May 31, 2011

(54) INSULATED BEARINGS FOR DOWNHOLE MOTORS

(75) Inventors: Clarence F. Hall, Jr., Claremore, OK (US); Dick L. Knox, Claremore, OK (US); Brett D. Leamy, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 959 days.

(21) Appl. No.: 11/838,421

(22) Filed: Aug. 14, 2007

(65) Prior Publication Data

US 2009/0047156 A1    Feb. 19, 2009

(51) Int. Cl.
*F04B 35/04*    (2006.01)
*F16C 19/50*    (2006.01)

(52) U.S. Cl. ................. 417/423.12; 384/476
(58) Field of Classification Search .......... 417/423.3, 417/423.12; 384/476
See application file for complete search history.

(56) References Cited

U.S. PATENT DOCUMENTS

| | | | |
|---|---|---|---|
| 1,998,888 A | 4/1935 | Wallgren | |
| 2,740,059 A * | 3/1956 | Conery | 310/87 |
| 4,320,931 A | 3/1982 | Shaffer | |
| 4,435,661 A * | 3/1984 | Witten | 310/90 |
| 4,513,215 A | 4/1985 | Del Serra | |
| 4,521,708 A | 6/1985 | Vandevier | |
| 4,620,601 A | 11/1986 | Nagel | |
| 4,717,761 A * | 1/1988 | Staniland | 528/125 |
| 5,189,328 A | 2/1993 | Knox | |
| 5,445,457 A | 8/1995 | Schliephack | |
| 5,795,075 A | 8/1998 | Watson | |
| 5,951,240 A | 9/1999 | Hall | |
| 6,030,128 A | 2/2000 | Pontzer | |
| 6,099,271 A | 8/2000 | Brookbank | |
| 6,315,497 B1 | 11/2001 | Wittman et al. | |
| 6,557,642 B2 | 5/2003 | Head | |
| 6,566,774 B2 | 5/2003 | Parmeter et al. | |
| 6,780,037 B1 | 8/2004 | Parmeter et al. | |
| 6,863,124 B2 | 3/2005 | Araux et al. | |
| 6,956,310 B1 | 10/2005 | Knox | |
| 6,966,701 B2 | 11/2005 | Schelbert | |
| 2005/0217859 A1 | 10/2005 | Hartman et al. | |

* cited by examiner

*Primary Examiner* — Charles G Freay
(74) *Attorney, Agent, or Firm* — Bracewell & Giuliani LLP

(57) ABSTRACT

A submersible pumping system for use downhole, wherein the system includes a pump, a pump motor, a seal section, a shaft coupling the pump motor to the pump, a bearing assembly for axially retaining the shaft in place, and an electrical insulator for electrically isolating the pump bearing assembly from electrical current leaking from the motor and through the shaft. The electrical insulator can be made from polyetheretherketone, polyimide, polyketone, and mixtures thereof.

20 Claims, 3 Drawing Sheets

INSULATED BEARINGS FOR DOWNHOLE MOTORS

BACKGROUND

1. Field of Invention

The present disclosure relates to downhole pumping systems submersible in well bore fluids. More specifically, the present disclosure involves insulated bearings for a submersible pump.

2. Description of Prior Art

Submersible pumping systems are often used in hydrocarbon producing wells for pumping fluids from within the well bore to the surface. These fluids are generally liquids and include produced liquid hydrocarbon as well as water. One type of system used in this application employs an electrical submersible pump (ESP). ESPs are typically disposed at the end of a length of production tubing and have an electrically powered motor. Often, electrical power may be supplied to the pump motor via wireline. The pumping unit is usually disposed within the well bore just above where perforations are made into a hydrocarbon producing zone. This placement thereby allows the produced fluids to flow past the outer surface of the pumping motor and provide a cooling effect.

With reference now to FIG. 1, an example of a submersible ESP disposed in a well bore is provided in a partial cross sectional view. In this embodiment, a downhole pumping system 10 is shown suspended on production tubing 18 within a cased wellbore 8. The downhole pumping system 10 comprises a motor 12, a seal section 14, and a pump 16. Energizing the motor drives a shaft coupled between the motor 12 and the pump section 16. Rotors coaxially disposed on the shaft rotate with shaft rotation within the pump body. The centrifugal action of the rotors produces a localized reduction in pressure in the cavities thereby inducing fluid flow into the cavities.

The source of the fluid drawn into the pump comprises perforations 20 formed through the casing of the wellbore 10; the fluid is represented by arrows extending from the perforations 20 to the pump inlet. The perforations 20 extend into a surrounding hydrocarbon producing formation 22. Thus the fluid flows from the formation 22, past the motor 12 on its way to the inlets.

Because of the long length of the motor, the rotor is made up of a number of rotor sections. Each rotor section comprises a large number of flat disks called laminations secured by copper rods. The rotor sections are spaced apart from each other. A bearing assembly is located between each section for maintaining the shaft in axial alignment. The rotor sections are keyed to the shaft for rotation therewith, but are axially movable with respect to the shaft.

Traditionally, the bearing assemblies used in motors, seal sections and pumps of electrical submersible pumps (ESPs) are plain sleeve bearings, which provide radial support. These plain sleeve bearings are not heavily loaded since a large number of bearings are typically used and the ESP units are run in a near vertical orientation. The absence of a substantial load results in an unstable or marginally stable bearing operation that can result in metal-to-metal contact in the bearings, which accelerates bearing failure.

One example of a bearing assembly is provided in a cross sectional view in FIG. 2. Shown is a shaft 24, circumscribed by a sleeve 26 and bearing assembly 32 within the pump housing 28. The bearing assembly 32 radially encompasses a portion of the sleeve 26 and comprises an insert 34, an outer race 36 and a T-ring 38. The sleeve 26 is coupled to the shaft 24, such as by a key, and rotates along with the shaft 24. The sleeve 26, and therefore the shaft 24, is radially supported by the insert 34. A lubricant film (not shown) allows for sleeve rotation within the insert. The T-ring 38 which is disposed in the space between the outer race 36 and the stator 30, prevents bearing rotation.

Pump failure can be initiated by an electrical discharge from an electrical supply source into the bearing assembly. The discharge may produce sparks that in turn create pitting in the bearing components, such as between the sleeve and the insert. Although the pitting exceeds lubricant thickness enabling metal to metal contact, this condition often evades detection since the motor will continue to operate after the pitting episode and smear the evidence. Confirmation of this failure mode requires microscopic detection.

SUMMARY OF INVENTION

The present disclosure includes a downhole submersible pumping system disposable in a cased wellbore comprising, a housing, a pump disposed within the housing, a seal section, a pump motor disposed within the housing, a shaft coupling the pump to the pump motor, a bearing assembly circumscribing a portion of the shaft, and an electrical insulator disposed between the shaft and the housing. In one embodiment, the bearing assembly comprises an annular insert formed for coaxial displacement around the shaft and an outer race coaxially circumscribing said insert, and wherein the insulator is disposed between the insert and the outer race. The electrical insulator may be made from polyetheretherketone, polyimide, polyketone, and mixtures thereof. Optionally, a tubular sleeve may be included coaxially disposed around the shaft, wherein the sleeve comprises the electrical insulator. The electrical insulator may be disposed within the sleeve, on its outer diameter, or on its inner diameter.

A method is included for electrically insulating a bearing assembly on an electrical submersible pump, wherein the electrical submersible pump comprises a pump motor, a pump, and a drive shaft mechanically coupling the pump motor to the pump. The method comprises coaxially disposing a bearing assembly on the shaft and electrically insulating a portion of the bearing assembly from the shaft. The insulating step may include inserting an electrical insulating barrier between the shaft and a portion of the bearing.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be through and complete, and will fully convey the scope of the invention to those skilled in the art. Like numbers refer to like elements throughout.

The present disclosure provides embodiments of a downhole submersible pumping system for producing fluids from within a wellbore up to the surface. The downhole submersible pumping system described herein includes a pump motor, a pump, and a shaft that mechanically couples of the pump motor with the pump. An electrical submersible pump is an example of a downhole submersible pumping system. Thus activation of the pump motor thereby produces corresponding rotation of the pump for pumping connate fluids from within a wellbore to the surface.

The embodiments herein described also include a bearing assembly disposed around a portion of the shaft, wherein the bearing assembly provides some radial support for the drive shaft of the pump motor. The bearing assembly described herein is insulated to prevent electrical transmission therethrough. Accordingly, any electrical leakage making its way to the drive shaft cannot be conducted through the bearing assembly to any surrounding hardware.

Figure 1:
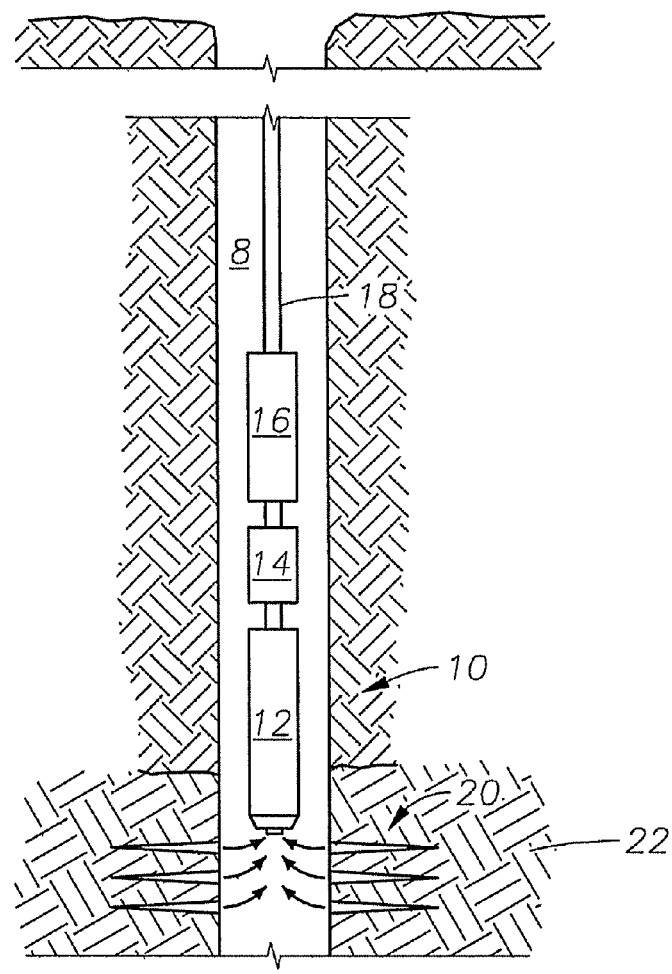
FIG. 1 is a side view of a pumping system disposed in a wellbore.
Figure 2:
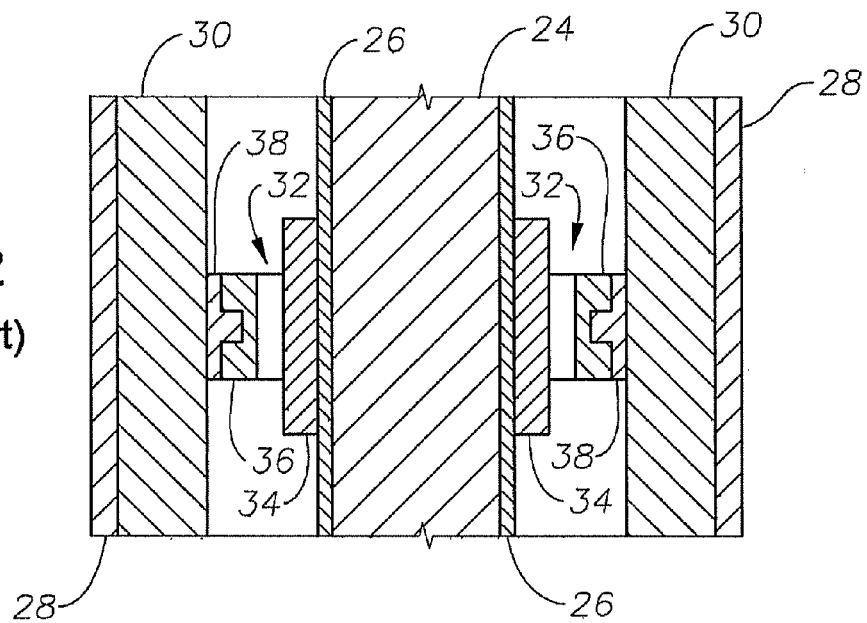
FIG. 2 is a cross sectional view of a prior art bearing system for use in a submersible pumping system.
Figure 3:
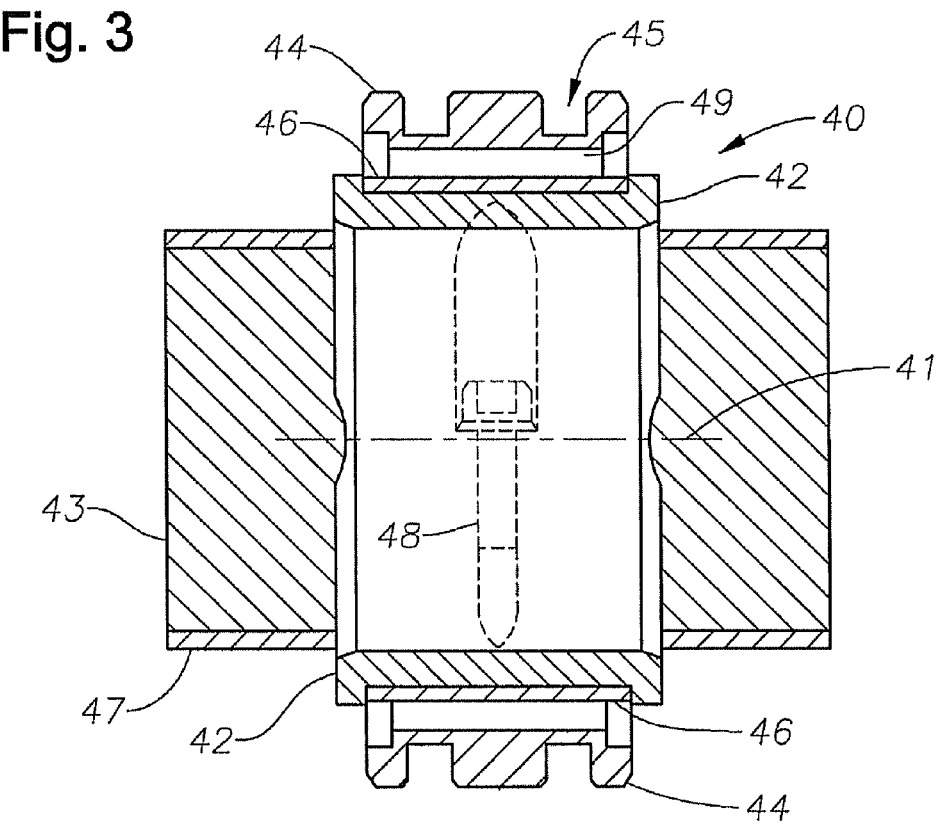
FIG. 3 is a cross sectional view of a bearing system for use in a submersible pumping system in accordance with the present disclosure.

FIG. 3 illustrates in a cross sectional side view one embodiment of an insulated bearing assembly. In the embodiment of FIG. 3, the bearing assembly 40 comprises an insert having an outer race 44 radially circumscribing the bearing assembly 40 outer circumference. The insert 42 is a generally tubular member whose inner diameter is configured to slide over the pump drive shaft 43. The line 41 represents the axis of the drive shaft 43. In the event the shaft 43 includes an optional sleeve 47, the bearing assembly 40 should be configured to slide over that as well. Thus, in the embodiment of FIG. 3, while the drive shaft 43 rotates, the insert 42 is designed to be relatively stationary. Rotating friction between the inner circumference of the insert 42 and the outer diameter of the drive shaft 43 (or the optional sleeve 47) will be addressed via a film of lubricant (not shown) disposed between these opposing surfaces.

The outer race 44, which also has a generally annular configuration, is disposed within an opening formed on the outer circumference of the insert 42. The outer race 44 has a generally rectangular cross-section with square like recesses 45 created on its outer radial surface. These optional recesses 45 are installed to receive a T-ring, wherein the T-ring may prevent radial rotation of the outer race 44, thereby preventing bearing assembly 40 rotation. The T-ring outer circumference of mates with either a stator of an electrical submersible pump, or the inner diameter of the housing of the pumping system. The T-ring however, does not prevent axial movement of the bearing assembly 40 with respect to the drive shaft.

In the embodiment of FIG. 3, an annular space defined by the outer radial surface of the insert 42 and the outer race 44 inner radial circumference is shown. Disposed within this annular space is an insulating barrier 46. The presence of the insulating barrier thereby prevents electrical communication from the insert 42 to the outer race 44. Accordingly, in the event of leakage of electrical potential to the drive shaft 43 or the sleeve 47, the bearing assembly 40 will not provide an electrical path from the shaft to the stator (not shown) or the pump housing. As such, the insulating barrier 46 prevents bearing assembly pitting or galling caused by an electrical discharge.

Examples of material making up the insulating barrier 46 include any non-conducting material. Polyetheretherketone (PEEK), polyketones, as well as polyimides each provide a suitable material for this insulator. Optionally, mixtures of these different compounds could be used to form an insulating barrier 46.

Figure 4:
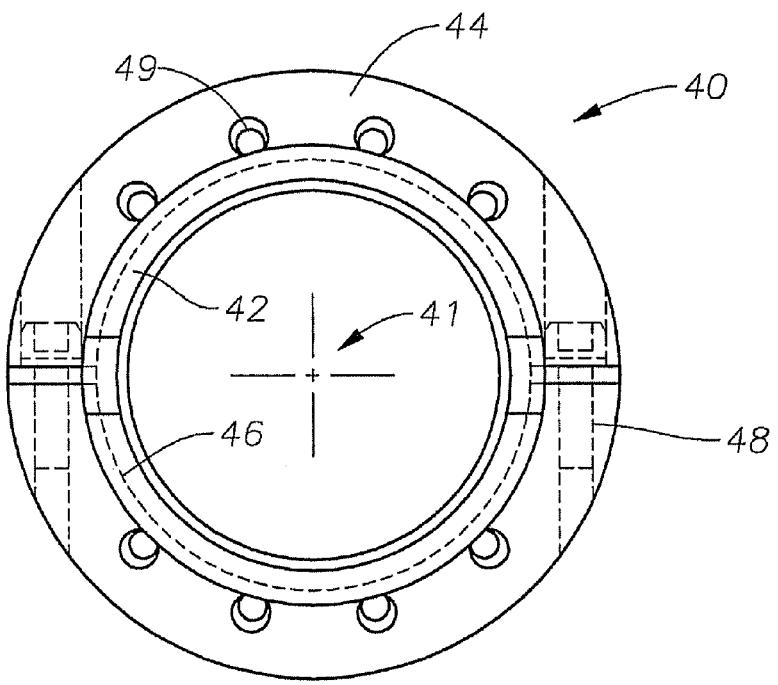
FIG. 4 is a side view of a bearing system for use in a submersible pumping system in accordance with the present disclosure.

FIG. 4 provides a side view of an embodiment of the bearing assembly. Here, the bearing assembly 40 is coaxially shown with reference to the drive shaft axis 41. Here, oil circulation holes 49 can clearly be seen formed through the body of the outer race 44. The oil circulation holes 49 provide a pathway for the flow of the dielectric oil packed within the pumping system. Also evident from this view is how the bearing assembly 40 comprises a pair of hemispherical sections coupled at their respective end by bolts 48. However, the bearing assembly 40 can be comprised of a single section without the need for a fastening attachment. Additionally, the assembly 40 can be made up of more than two sections. Also shown in the side view of FIG. 4 is the insulating barrier 46 represented by a dashed line there between the insert 42 and the outer race 44.

Figure 5A:
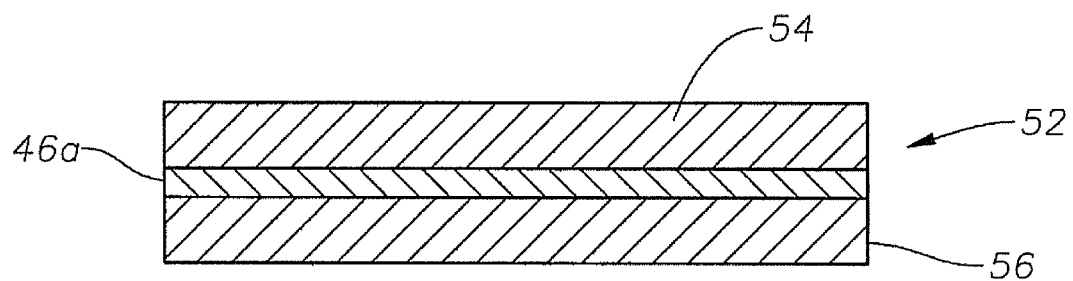
FIGS. 5a-5c are cross sectional views of a sleeve for use in an electrical submersible pumping system.
Figure 5B:
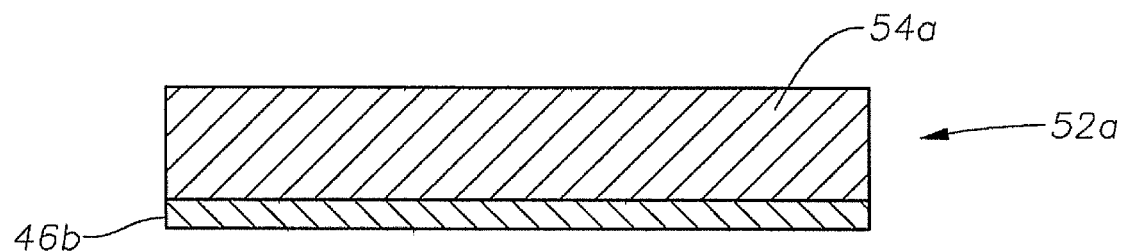
Figure 5C:
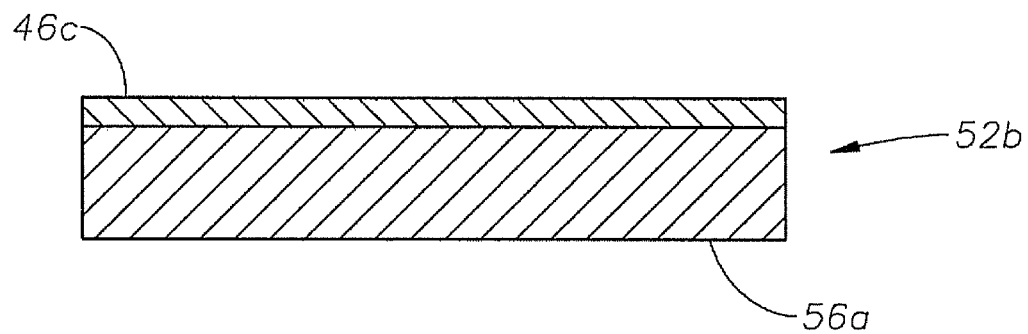

FIGS. 5a through 5c illustrate cross sectional views of embodiments of an optional sleeve 52 for use with a drive shaft 43. With respect to FIG. 5a, the sleeve 52 comprises an outer portion 54 and an inner portion 56 with an insulating barrier 46 sandwiched in between these respective portions. The sleeve 52 of FIG. 5a would be configured such that the inner portion would be proximate to the outer circumference of a drive shaft and the upper portion would be in contact with a bearing assembly insert. Also, it should be pointed out that in this embodiment the insulating barrier 46a encompasses the entire region between the outer and inner portions (54, 56). Accordingly, in this view, the cross section can be from an axial view along the sleeve or radial view looking at a sleeve cutaway.

FIG. 5b illustrates a cross sectional view of a sleeve 52a embodiment comprising an outer portion 54a with an insulating barrier 46b disposed on the lower portion of the sleeve 52a. Here, the sleeve would be disposed on the corresponding drive shaft such that the insulating barrier 46b is between the drive shaft and the outer portion 54a. Thus a corresponding bearing assembly insert would be disposed proximate to the upper surface of the outer portion 54a.

Similarly, as seen in FIG. 5c, another embodiment of a sleeve 52b is shown comprising an insulating barrier 46c on the outer radial surface of an inner portion 56a. In this embodiment, the sleeve 52b would be coupled with a drive shaft wherein the inner portion 56a would ride on the drive shaft. Whereas, the corresponding insert of a bearing assembly would be proximate to the insulating barrier 46c. Accordingly, using the insulating barrier in combination with the sleeve as shown in FIGS. 5a through 5c, a sleeve for use with a drive shaft of an electrical submersible pump could provide an electrically insulating barrier to prevent electrical arcing through a bearing assembly.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

The invention claimed is:

1. A downhole submersible pumping system disposable in a cased wellbore comprising:
   a pump;
   a seal section;
   a pump motor having a housing;
   a shaft coupling the pump to the pump motor;
   a bearing assembly disposed within the housing and having an outer race circumscribing a portion of the shaft; and
   an electrical insulator disposed between the shaft and the outer race.

2. The pumping system of claim 1, wherein the bearing assembly further comprises an annular insert formed for coaxial displacement around the shaft, wherein the outer race coaxially circumscribes the insert, and wherein the insulator is disposed between the insert and the outer race.

3. The pumping system of claim 1, wherein the electrical insulator is selected from the list consisting of polyetheretherketone, polyimide, polyketone, and mixtures thereof.

4. The pumping system of claim 1, further comprising a tubular sleeve coaxially disposed around the shaft, wherein the sleeve comprises the electrical insulator.

5. The pumping system of claim 4, wherein the electrical insulator is disposed within the sleeve.

6. The pumping system of claim 4, wherein the electrical insulator is disposed on the sleeve inner circumference.

7. The pumping system of claim 4, wherein the electrical insulator is disposed on the sleeve outer circumference.

8. An electrical submersible pump for producing wellbore fluids comprising:
   a pump;
   a pump motor;
   a seal section;
   a shaft mechanically coupling the pump motor to the pump;
   a shaft bearing assembly coaxially formed around a portion of the shaft comprising an insert coaxially circumscribing a portion of the shaft and an outer race coaxially circumscribing the insert; and
   an electrical insulating sheet disposed in the region defined by the shaft outer diameter and the bearing assembly outer diameter, wherein the electrical insulating sheet electrically insulates the insert from the outer race.

9. The electrical submersible pump of claim 8 further comprising a tubular sleeve coaxially disposed between the shaft and the bearing assembly, wherein the sleeve comprises the electrical insulating sheet.

10. The electrical submersible pump of claim 9, wherein the electrical insulating sheet is on the sleeve inner diameter.

11. The electrical submersible pump of claim 9, wherein the electrical insulating sheet is on the sleeve outer diameter.

12. The electrical submersible pump of claim 9, wherein the electrical insulating sheet is sandwiched within the sleeve.

13. The electrical submersible pump of claim 9, wherein the electrical insulating sheet is selected from the list consisting of polyetheretherketone, polyimide, polyketone, and mixtures thereof.

14. A method of producing a fluid from a wellbore comprising:
   (a) forming an electrical submersible pump, wherein the electrical submersible pump comprises a pump motor, a pump, a seal section, and a drive shaft within the pump motor;
   (b) providing a bearing assembly having an outer race, an inner race circumscribed by the outer race, and electrical insulation between the inner and outer races;
   (c) coaxially disposing the bearing assembly on the shaft so that the electrical insulation is between the outer race and shaft;
   and
   (d) disposing the electrical submersible pump within the wellbore.

15. The method of claim 14, wherein the electrical insulation comprises a material selected from the list consisting of polyetheretherketone, polyimide, polyketone, and mixtures thereof.

16. The method of claim 14, wherein the bearing assembly comprises an insert coaxially disposed around the shaft and an outer race coaxially formed around the insert, and wherein the space between the insert and the outer race is electrically insulated.

17. The method of claim 14 further comprising, adding an electrically insulating sleeve between the shaft outer diameter and the bearing assembly inner diameter.

18. The method of claim 17, wherein the sleeve comprises an electrical insulator on its inner diameter.

19. The method of claim 17, wherein the sleeve comprises an electrical insulator on its outer diameter.

20. The method of claim 17, wherein the sleeve comprises an electrical insulator.

* * * * *

UNITED STATES PATENT AND TRADEMARK OFFICE
CERTIFICATE OF CORRECTION

PATENT NO. : 7,950,906 B2  
APPLICATION NO. : 11/838421  
DATED : May 31, 2011  
INVENTOR(S) : Clarence E. Hall, Jr. et al.

Page 1 of 1

It is certified that error appears in the above-identified patent and that said Letters Patent is hereby corrected as shown below:

Column 3, line 58, delete "of" before "mates with"

Signed and Sealed this
First Day of November, 2011

David J. Kappos
*Director of the United States Patent and Trademark Office*